United States Patent
Fielers et al.

(10) Patent No.: US 10,612,714 B2
(45) Date of Patent: Apr. 7, 2020

(54) COLLAR FOR AN INSPECTION OR CLEANING PIG

(71) Applicant: ROSEN Swiss AG, Stans (CH)

(72) Inventors: Frank Fielers, Lingen (DE); Nico Kühbach, Lingen (DE)

(73) Assignee: ROSEN Swiss AG (CH)

( * ) Notice: Subject to any disclaimer, the term of this patent is extended or adjusted under 35 U.S.C. 154(b) by 423 days.

(21) Appl. No.: 15/025,016

(22) PCT Filed: Sep. 26, 2014

(86) PCT No.: PCT/EP2014/002616
§ 371 (c)(1),
(2) Date: Mar. 25, 2016

(87) PCT Pub. No.: WO2015/049041
PCT Pub. Date: Apr. 9, 2015

(65) Prior Publication Data
US 2016/0238184 A1    Aug. 18, 2016

(30) Foreign Application Priority Data

Oct. 4, 2013    (DE) .................. 10 2013 111 019

(51) Int. Cl.
*F16L 55/40*    (2006.01)
*F16L 55/38*    (2006.01)
(Continued)

(52) U.S. Cl.
CPC .............. *F16L 55/40* (2013.01); *B08B 9/055* (2013.01); *B08B 9/0551* (2013.01);
(Continued)

(58) Field of Classification Search
CPC ....... F16L 55/38; F16L 55/26; F16L 2101/12; F16L 55/40; F16L 55/28; F16L 55/32;
(Continued)

(56) References Cited

U.S. PATENT DOCUMENTS 2,328,093 A    8/1943    Osborn et al.
5,127,125 A *  7/1992    Skibowski ............ B08B 9/0554
                                                            137/268
(Continued)

FOREIGN PATENT DOCUMENTS

DE        19746510 C2    3/2003
EP        1215436 A2 *   6/2002    ........... B08B 9/0554

*Primary Examiner* — Laura C Guidotti
*Assistant Examiner* — Aaron R McConnell
(74) *Attorney, Agent, or Firm* — Husch Blackwell LLP

(57) ABSTRACT

A collar for a cleaning or inspection pig which is movable in a pipeline and through the latter. The collar may include an inner fastening region, with respect to a longitudinal center axis of the collar, for fixing the collar to the cleaning or inspection pig. The collar may also include a contact region which is provided for contact against a pipe wall and which is part of an outer segment which is connected to the inner fastening region. The inner fastening region is preferably in advance of the contact region with respect to a direction of movement (F) of the pig. The collar comprises an anchoring segment, the first end of which is arranged on the outer segment and the other, second end of which is arranged, with respect to the longitudinal center axis, further toward the latter and trailing the first end with respect to a direction of movement of the pig. A pig for cleaning or inspecting pipeline pipes may also be provided.

10 Claims, 7 Drawing Sheets

(51) Int. Cl.
    *B08B 9/055*    (2006.01)
    *F16L 101/12*   (2006.01)
    *F16L 101/30*   (2006.01)

(52) U.S. Cl.
    CPC ............ *B08B 9/0557* (2013.01); *F16L 55/38* (2013.01); *F16L 2101/12* (2013.01); *F16L 2101/30* (2013.01)

(58) Field of Classification Search
    CPC . F16L 55/34; F16L 55/36; F16L 55/44; B08B 9/0557; B08B 9/053; B08B 9/055
    USPC ................... 15/104.061; 137/15.07, 268, 242
    See application file for complete search history.

(56) References Cited

U.S. PATENT DOCUMENTS

| | | | |
|---|---|---|---|
| 2008/0141474 A1* | 6/2008 | Kapustin | B08B 9/0436 15/104.066 |
| 2014/0209126 A1* | 7/2014 | Doig | F16L 55/38 134/22.12 |

* cited by examiner

Prior Art

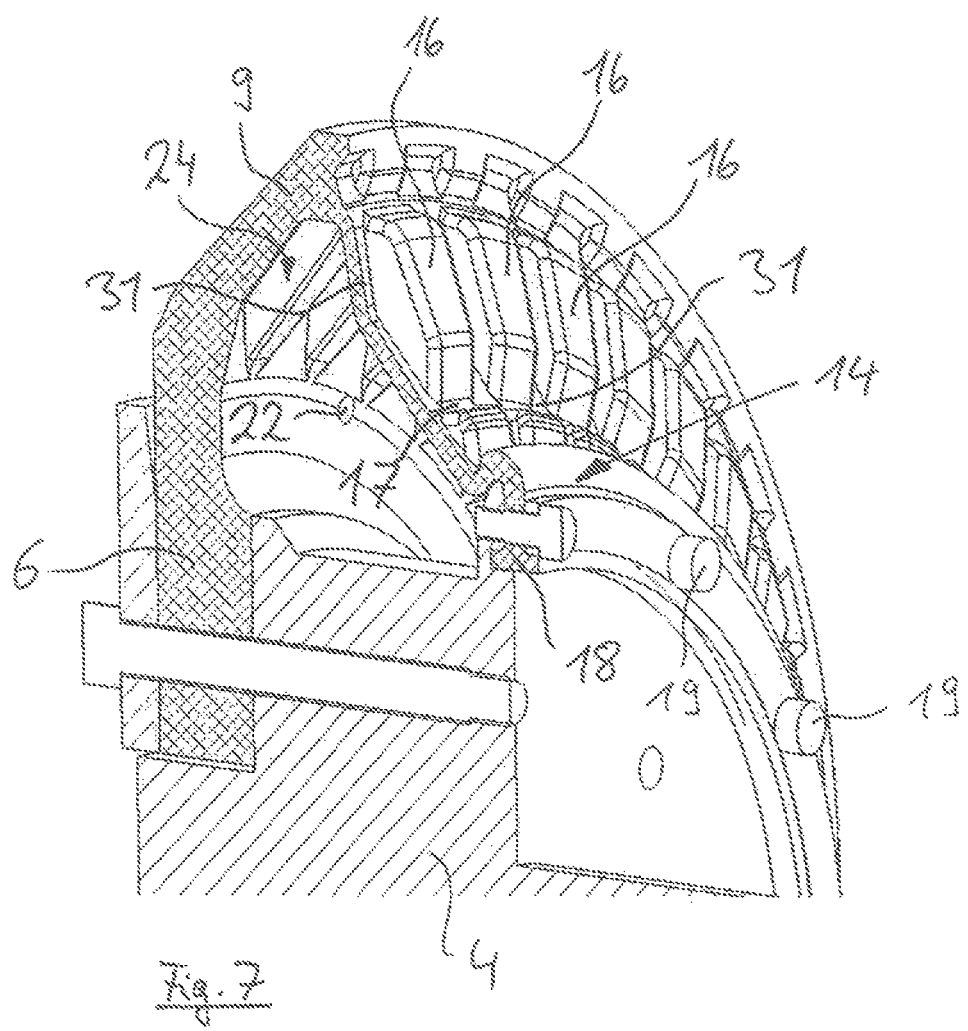

COLLAR FOR AN INSPECTION OR CLEANING PIG

CROSS REFERENCE

This application is a national phase application of PCT/EP2014/002616 filed Sep. 26, 2014, which itself claims priority to German Application No. 10 2013 111019.3, filed Oct. 4, 2013, the entirety of both of which are hereby incorporated by reference.

FIELD OF THE INVENTION

The present invention relates to a collar for a cleaning or inspection pig which is movable in a pipeline and through the latter, with an inner fastening region, with respect to a longitudinal center axis of the collar, for fixing the collar to the cleaning or inspection pig, and with a contact region which is provided for contact against a pipe wall and which is part of an outer segment which is connected to the inner fastening region, wherein the inner fastening region is preferably at least partially in advance of the contact region with respect to a direction of movement of the pig. Furthermore, the invention relates to a pig for inspecting or cleaning pipeline pipes.

BACKGROUND OF THE INVENTION

Passively operated pigs are used for inspecting and cleaning pipelines, for example gas or oil pipelines. For the propulsion, which is carried out by the medium, the pigs are provided with collars which, in the direction of their longitudinal center axis, which also corresponds to the longitudinal center axis of the pipeline, cover the free pipeline cross section as well as possible. The medium presses against the collars and therefore drives the pig forward. Collars which are of substantially flat design in the direction of their planar extent are known, Said disk-shaped collars are also called "disks". Collars which are bent or buckled toward the edges and rearward with regard to a preferred and forward direction of movement are referred to as "cups". In this respect, the inner fastening region, at least with its front side pointing forward in the direction of movement, is in advance of the contact region located on the rearwardly bent, outer segment. The outermost edge region of said collars can even extend in a planar manner with respect to the pipe inner wall. The two types of collars are shown in DE 195 02 764 A1. Specifically in the case of these cups, but also in the case of the disks, there is the problem, in the event of a differential pressure increase because of, for example, pipe inside diameters which taper excessively and in which the pig is greatly slowed down or may become stuck, in particular in pipelines through which gas flows, that, in the event of a differential pressure increase, the friction of the collar against the pipe inner wall greatly increases. When the frictional force is overcome, this results in what is referred to as a forward shooting of the pig at a greatly increased speed which lies outside the tolerances predetermined for cleaning or measurement. Undesirable pressure fluctuations are caused in the pipeline by the pig becoming stuck and shooting forward.

SUMMARY OF THE INVENTION

It is the object of the present invention to provide a collar and a pig, with which the running behavior of a pig in the pipeline can be steadied.

According to the invention, it is provided that the collar comprises an anchoring segment, the first end of which is arranged on the outer segment and the other, second end of which is arranged, with respect to the longitudinal center axis, further toward the latter and trailing the first end with respect to a direction of movement of the pig. By this means, a part of the collar that would result in a deflection of the driving force in a direction away from the longitudinal center axis in the direction of the pipe wall can be covered by the anchoring element or anchoring segment. The anchoring segment is arranged here in such a manner that a differential pressure increase results in a partial increase in the pressure in the direction of the longitudinal center axis. The anchoring element therefore draws the outer segment of the collar inward, which opposes the increased pressure in the outward direction. Ideally, the increased pressures in the direction of the longitudinal center axis and opposite thereto to the outside can be compensated for and set in such a manner that, in the event of cross-sectional changes that are typically to be anticipated in the pipeline, the increase in friction caused by the cross-sectional change is compensated for in total. The pressure outward arises—as viewed in the direction of the longitudinal center axis—by the collar regions which are not covered by the anchoring element and which, in the event of an increase in the differential pressure when the pig slows down or becomes stuck, are pressed outward to an increased extent and therefore increase the friction of the collar against the pipe wall of the pipeline. According to the invention, the collar geometry subjected to differential pressure is therefore varied in order to reduce the radial force on the pipeline wall. The trailing arrangement of the inner, second end results in the formation of a surface which, when a force acts on said surface, has resulting force in the direction of the longitudinal center axis irrespective of the shape of the anchoring element.

By means of a collar design according to the invention, a pig provided with said collar exhibits a more steady running behavior. The wear of the collars is reduced and the pressure fluctuations in the pipeline are reduced.

The anchoring segment is preferably arranged on the outer segment at a distance from the contact region in the direction of the longitudinal center axis, while the second end is fixable or fixed on the fastening region or on a pig part. The arrangement of the anchoring segment is such that the anchoring segment is arranged on a side facing rearward or inward and at a distance from the outermost circumference of the outer segment. One part of the outer segment can continue still to be approached directly by the medium, whereas an inner part of the collar, which can be approached by the flow, is now formed by the anchoring element. A differential pressure increase on the anchoring element results in a force in the direction of the longitudinal center axis.

A further advantageous embodiment of the invention is distinguished in that the anchoring segment at least partially forms a cavity with respect to the outer segment and/or with respect to the inner fastening region. The cavity is at least present in the fastening situation on the pig. The collar would then have an undercut or recess in its unmounted form. By means of the formation with a cavity, the anchoring element which is preferably flexible, pliable or partially of articulated design is movable better under differential pressure increase.

For pressure equalization, the collar can be provided with a pressure-equalizing opening which, with regard to a direction of movement, leads from the front to the cavity. The damping properties of the collar can be influenced by the size of the pressure-equalizing opening. A smaller opening thus results in a slower dimensional change of the collar. In order to be able to permit a bypass flow over the entire pig, the anchoring segment can also be provided with openings. However, said openings have to be smaller in total over the entire cross-sectional area than the front pressure-equalizing opening(s) so that the predominant portion of pressure on the anchoring segment decreases.

A specific shape under pressure and desired movability of the anchoring segment is achieved if the anchoring segment is provided with at least one joint for the forced guidance of individual anchoring segment sections. The anchoring segment preferably has two, three or more segment sections which are connected via joints, for example, in the form of film hinges. The use of joints results in the formation of a desired cross-sectional shape of the anchoring segment. A specific change in shape can be achieved by regions of the segment of differing thickness and an associated different rigidity of the respective regions.

An anchoring segment section located between two joints is preferably designed to be thicker than the joint in order to have sufficient stability.

As an alternative or in addition to joints or joint regions designed as thin points, the anchoring segment can be manufactured from different materials. For example, a soft plastics material can thus be used for the joints and a stiff plastics material can be used for the remaining parts of the anchoring segment.

The installation of a collar according to the invention is possible in an improved manner if the anchoring segment has a fastening flange at its second end, in particular for introducing into a region of the pig of complementary design. For example, this may be a plug-in part which is secured on the pig via screws.

For improved adaptation to different pipe inside diameters, the anchoring segment can have thin regions in the circumferential direction. Said thin regions separate regions of the anchoring segment which are of more stable and in particular thicker design. Therefore, in the event of a reduction or increase in the free pipeline diameter and an associated compression or expansion of the collar, the anchoring element can also be better compressed or expanded.

The collar is preferably produced integrally with the anchoring segment and in particular from polyurethane. Comparatively complex collar shapes can be produced in a simple manner with said material.

The previously described advantages are also conferred on a pig for cleaning or inspecting pipeline pipes, which pig has a collar described previously or subsequently.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 7 shows a partial view of further subject matter according to the invention in a perspective illustration.

DETAILED DESCRIPTION OF THE DRAWINGS

Individual technical features of the subsequently described exemplary embodiments can also be combined in combination with previously described exemplary embodiments and the features of the independent claims and possible further claims to form subject matter according to the invention.

Figure 1:
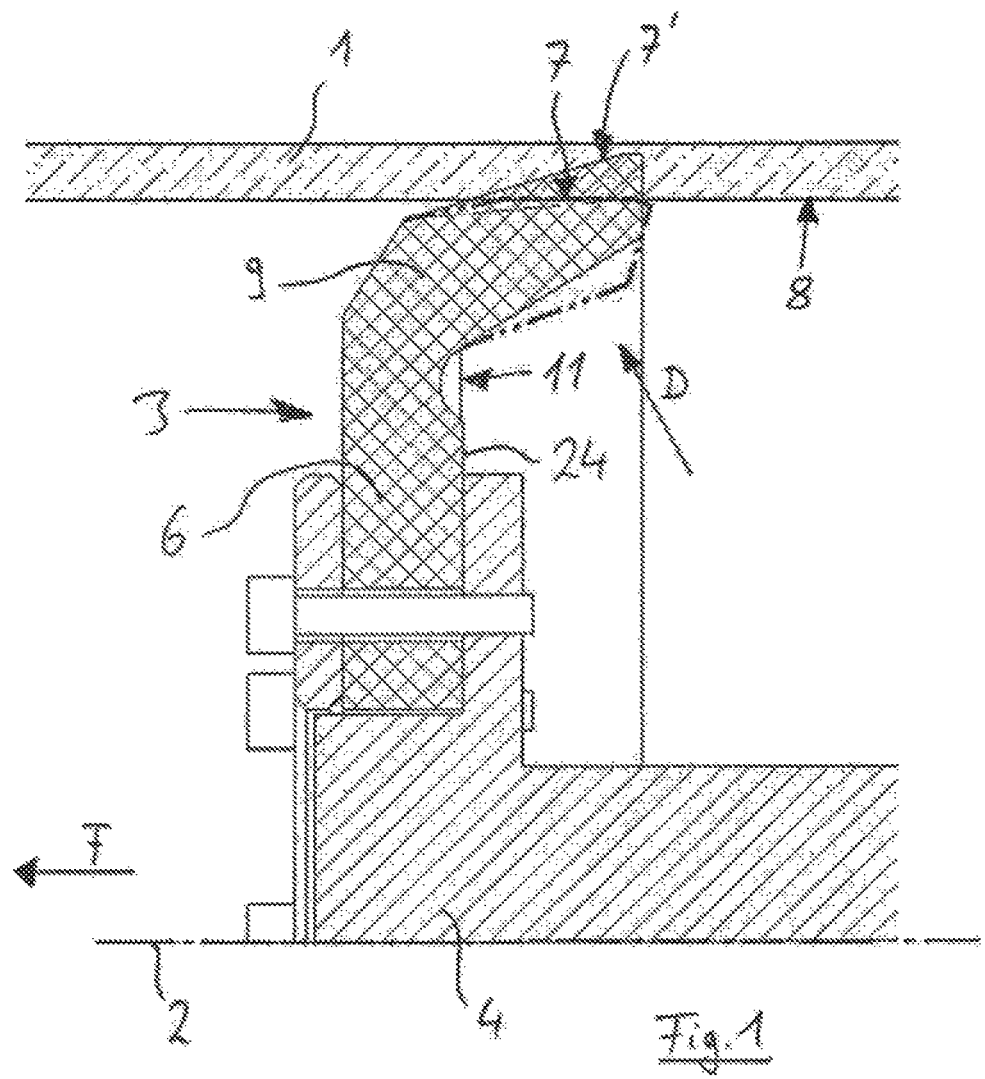
FIG. 1 shows a partial sectional view of a device according to the prior art.

Subject matter according to the preamble of claim 1 is shown in FIG. 1 in a partial sectional view which illustrates an upper part of a pig according to the invention. The pig, which is illustrated only by a front region, moves in the direction F through a pipeline, of which one wall 1 is partially illustrated. A collar according to the invention for said pig, which is designed as a cleaning or inspection pig, has a longitudinal center axis 2 around which the collar 3 is formed. The longitudinal center axis 2 points in the direction of a longitudinal center axis of the pipeline.

The collar 3 has an inner fastening region 6 which is fastened to a pig body 4, and a contact region 7 which is shown by chain-dotted lines, is directed toward the pipe wall and presses against an inside 8 of the pipe wall 1. In the relaxed form of the collar, the contact region 7 would be deployed further outward as contact region 7'. The contact region 7 or 7' is part of an outer segment 9 which, in the present case, is connected to the inner fastening region 6 via a thin point 11. The collar 3 is a customary cup, as is known from the prior art.

In the event of a differential pressure increase because of a slowing down of the movement of the pig, an additional force component is produced in the direction of the arrow D, said force component resulting in an increase in the friction against the pipe wall 1.

Figure 2:
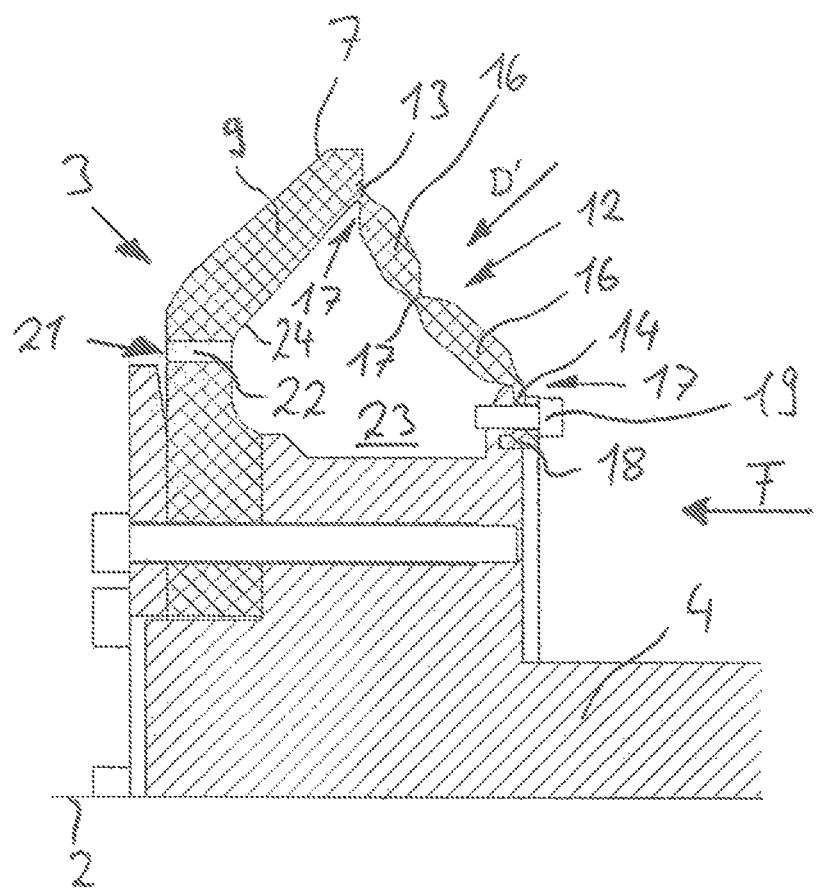
FIG. 2 shows a partial sectional view of a device according to the invention.

A pig according to the invention or a collar 3 according to the invention has an anchoring segment 12 which comprises a first end 13, which is arranged on the outer segment 9, and a second end 14 which is arranged on the pig body 4 and therefore toward the longitudinal center axis 2 (FIG. 2). Furthermore, said second end 14 is arranged upstream of the first end 13 with regard to a direction of movement F, By means of this arrangement, in the event of a differential pressure increase because of a situation in which the pig moves more slowly or even becomes stuck in the pipeline, an additional force component is produced in the direction D' toward the longitudinal center axis 2, said force component opposing a force component in the direction D, if present. The pig can therefore move more uniformly through the pipeline, since the pig already continues in the event of relatively small differential pressures, and therefore the resulting differential speeds should overshooting occur turn out to be smaller.

The anchoring segment 12 according to the invention which, precisely like the outer segment 9 and the fastening region, is arranged in an encircling manner around the longitudinal center axis 2, comprises a total of three joints 17 in the form of film hinges which bound two thicker anchoring segment sections 16.

The joints 17 are designed as thin points. At the end 14, the anchoring segment 12 furthermore has a fastening flange 18 which is inserted in a corresponding recess of the pig body 4 and is fixed in said recess via a fastening means 19. A multiplicity of such fastening means, which are preferably in the form of screws, are present in the circumferential direction around the longitudinal center axis 2.

A pressure-equalizing opening 21 leads into a channel 22 via which a cavity 23 is equalized in terms of pressure with the region located in front of the pig.

The anchoring segment 12 is not arranged at the outermost end of the collar 3, with regard to a radial extent of same, but rather is offset further inward, and therefore, as viewed in the longitudinal direction F, a part of the collar 3 is approached directly by the medium, whereas a predominant part of the medium no longer flows against an inner surface 24 of the inner fastening region or of the outer segment of the collar 3, but rather against the anchoring segment 12.

Figure 3:
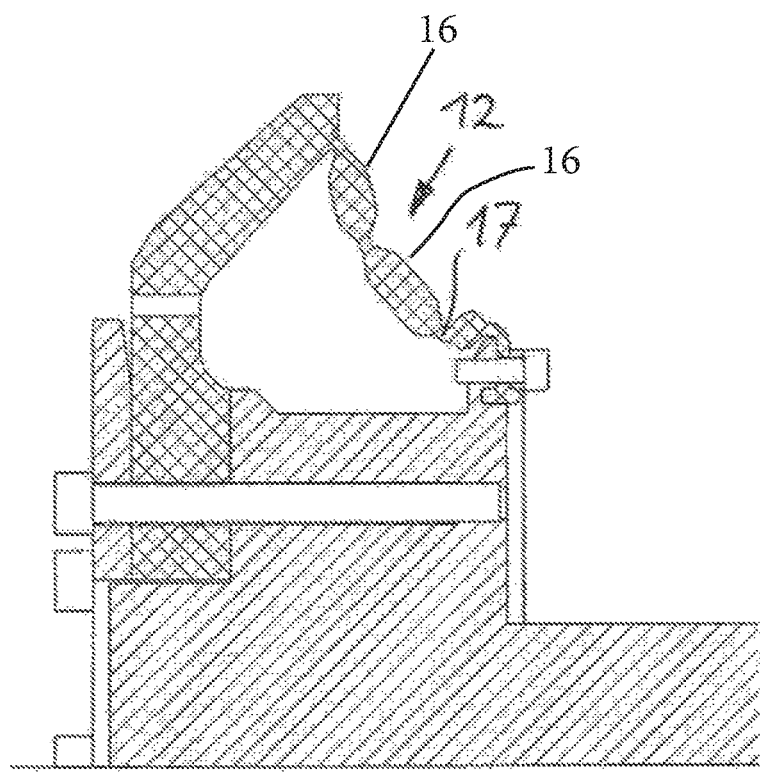
FIG. 3 shows further subject matter according to the invention in a partial sectional view.

In the exemplary embodiment according to FIG. 3, a cup is likewise again developed in accordance with the invention, wherein the anchoring segment here has an additional anchoring segment section 16 which is likewise again of thickened design and is connected to the rest of the anchoring segment 12 via joints 17 forming film hinges. The exemplary embodiments of FIGS. 2 and 3 are provided with collars 3 which are manufactured integrally from polyurethane.

Figure 4:
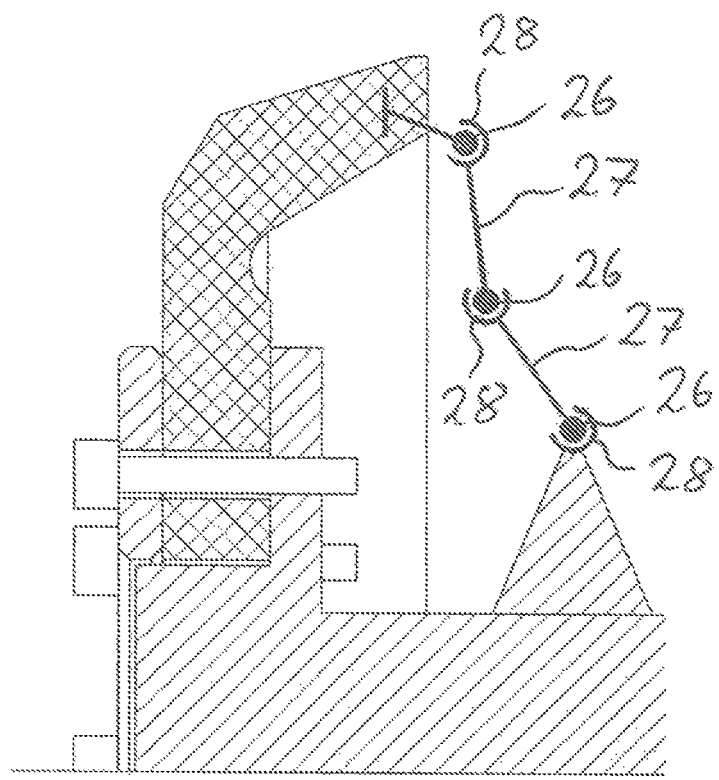
FIG. 4 shows further subject matter according to the invention in a partial sectional view.
Figure 5:
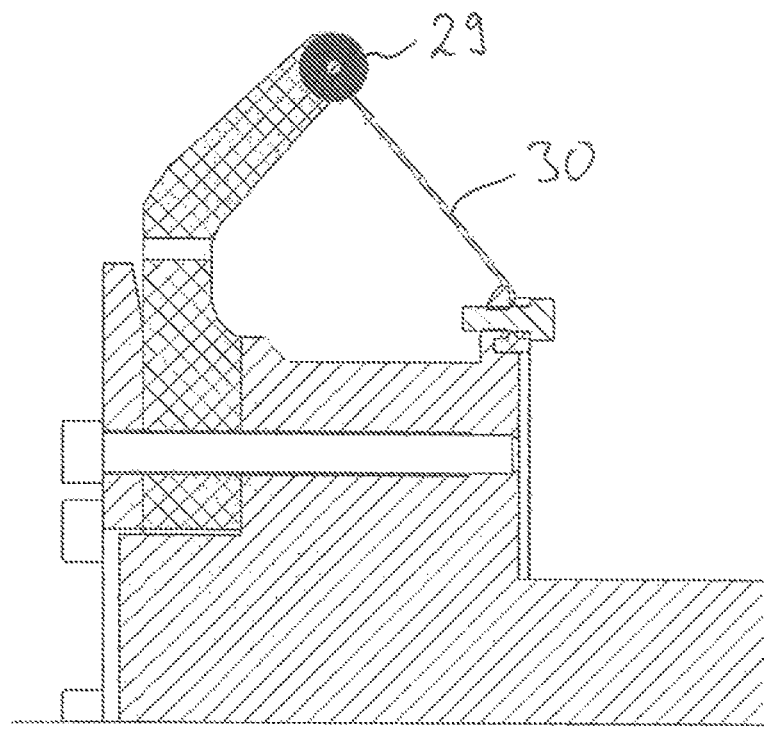
FIG. 5 shows further subject matter according to the invention in a partial sectional view.

In the exemplary embodiment of FIG. 4, the anchoring segment is provided with rigid sections 27 which are connected to one another via joints 26. This may involve an exemplary embodiment according to FIG. 3. However, anchoring segment parts may also be involved that are actually not produced integrally with the rest of the collar, but rather are composed of a different material and the joints of which are designed to be movable to a limited extent corresponding to the opening of the respective half shells 28. In the exemplary embodiment according to FIG. 5, the anchoring segment is formed by a membrane 30 which is pliable and which can buckle under the action of pressure. A roller 29 is provided on the outer side, the roller allowing for rolling along a pipe inner wall.

Figure 6:
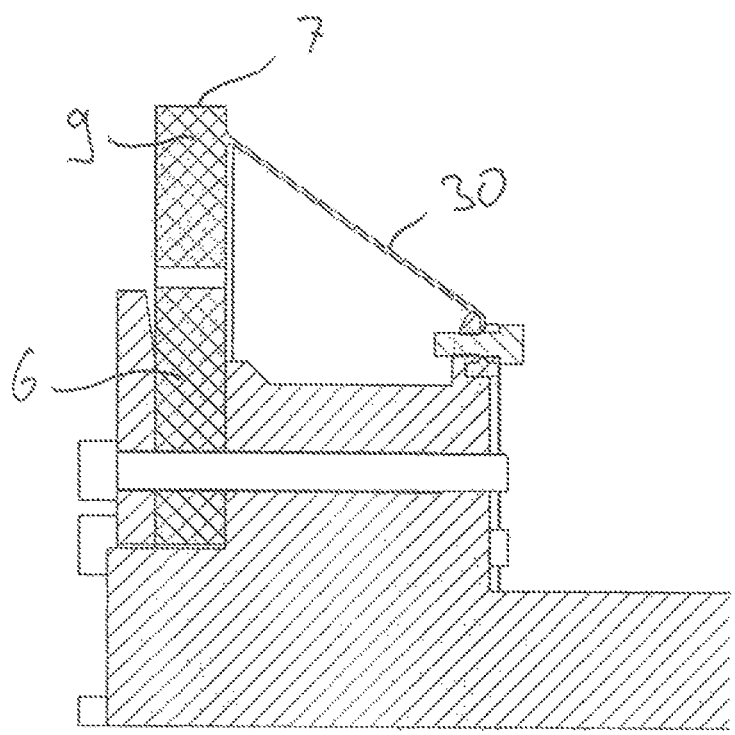
FIG. 6 shows further subject matter according to the invention in a partial sectional view.

A conventional disk can likewise be provided with an anchoring segment 12 in the form of a membrane 30, as is illustrated in FIG. 6.

In a circumferential direction about the longitudinal center axis 2, a pig according to the invention can be provided with a collar 3 which has an anchoring segment 12 which comprises thickened anchoring segment sections 16 which are separated from one another by thin regions 31 (FIG. 7). A compression of the collar 3 is thereby possible in an improved manner, since the anchoring segment 12 is formed in a flexible manner by means of the thin regions 31.

The invention claimed is:

1. A collar for a cleaning or inspection pig which is movable in a pipeline, said collar comprising:
   an inner fastening region with respect to a longitudinal center axis of the collar, said inner fastening region fixing the collar to the cleaning or inspection pig;
   a contact region which is provided for contact against a pipe wall and which is part of an outer segment which is connected to the inner fastening region;
   an anchoring segment having a length extending between a first end and a second end, the first end of which is arranged on the outer segment proximate the contact region, and the second end of which is arranged radially inwardly of the contact region and upstream of the first end with respect to a direction of movement of the pig, the anchoring segment being connected to at least one of the collar and pig only at the first end and second end connections such that a remainder of the length of the anchoring segment is not connected directly or indirectly to the pig or collar;
   wherein relative positioning and connections between (a) the contact region and anchoring segment, and between (b) the outer segment and the anchoring element, being such that upstream pressure causes the anchoring segment to pull radially inwardly on the contact region, thereby decreasing pressure applied by the contact region to the pipe wall;
   wherein the inner fastening region is preferably in advance of the contact region with respect to a direction of movement (F) of the pig.

2. The collar as claimed in claim 1, wherein the anchoring segment is arranged on the outer segment at a distance from the contact region in the direction of the longitudinal center axis, and the second end is fixable or is fixed on the fastening region or on a pig part.

3. The collar as claimed in claim 1, wherein the anchoring segment at least partially forms a cavity proximate at least one of the outer segment and the inner fastening region.

4. The collar as claimed in claim 3, wherein the collar has a pressure-equalizing opening which, with regard to a direction of movement (F), leads from a front of the collar to the cavity.

5. The collar as claimed in claim 1 wherein the anchoring segment is formed with at least one joint for the forced guidance of individual anchoring segment sections.

6. The collar as claimed in claim 5, wherein the anchoring segment has at least two joints; wherein an anchoring segment section located between two joints is designed to be thicker than at least one of the joints.

7. The collar as claimed in claim 1 wherein the anchoring segment has a fastening flange at its second end for introducing into a region of complementary design.

8. The collar as claimed in claim 1 wherein the anchoring segment has thin regions in a circumferential direction for improved adaptation to different pipe inside diameters.

9. The collar as claimed in claim 1 wherein the collar is produced integrally with the anchoring segment.

10. A pig for cleaning or inspecting pipeline pipes, said pig comprising a collar as claimed in claim 1.

* * * * *